April 20, 1965     A. HEILBRUNN     3,179,304
VOLUMETRIC FEEDER
Filed Nov. 13, 1962     3 Sheets-Sheet 1
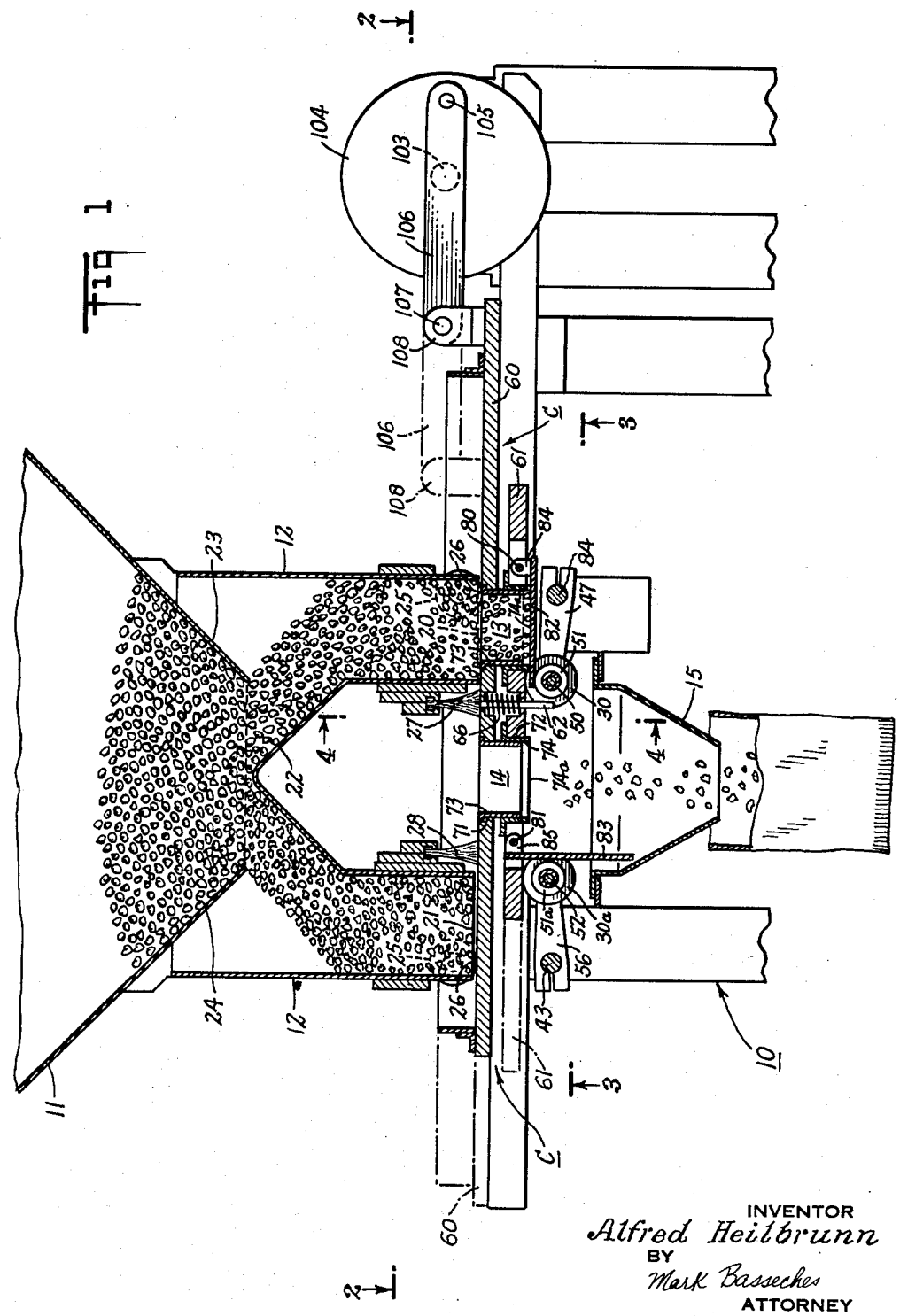
INVENTOR
Alfred Heilbrunn
BY
Mark Basseches
ATTORNEY

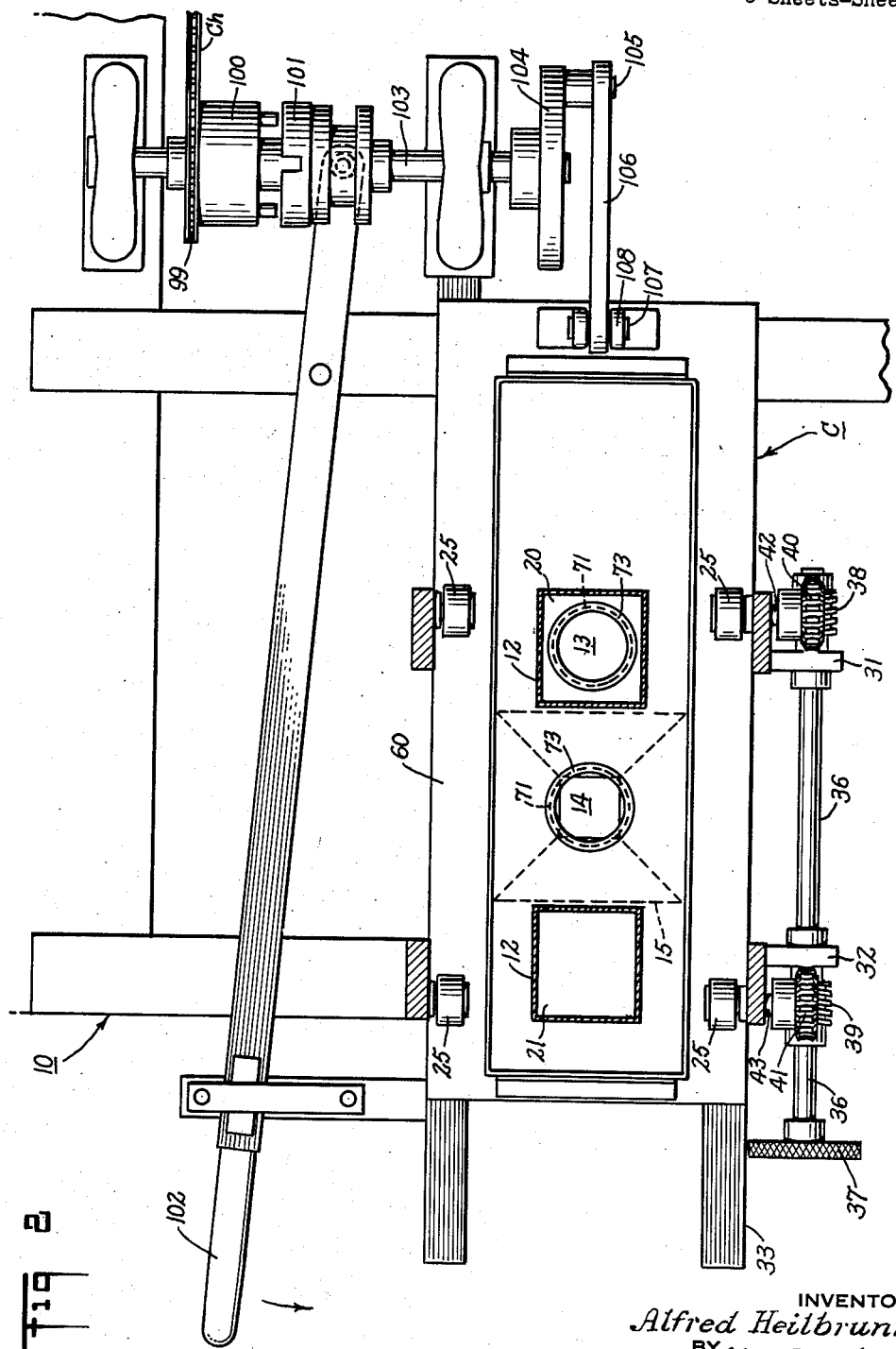

April 20, 1965  A. HEILBRUNN  3,179,304
VOLUMETRIC FEEDER
Filed Nov. 13, 1962  3 Sheets-Sheet 3
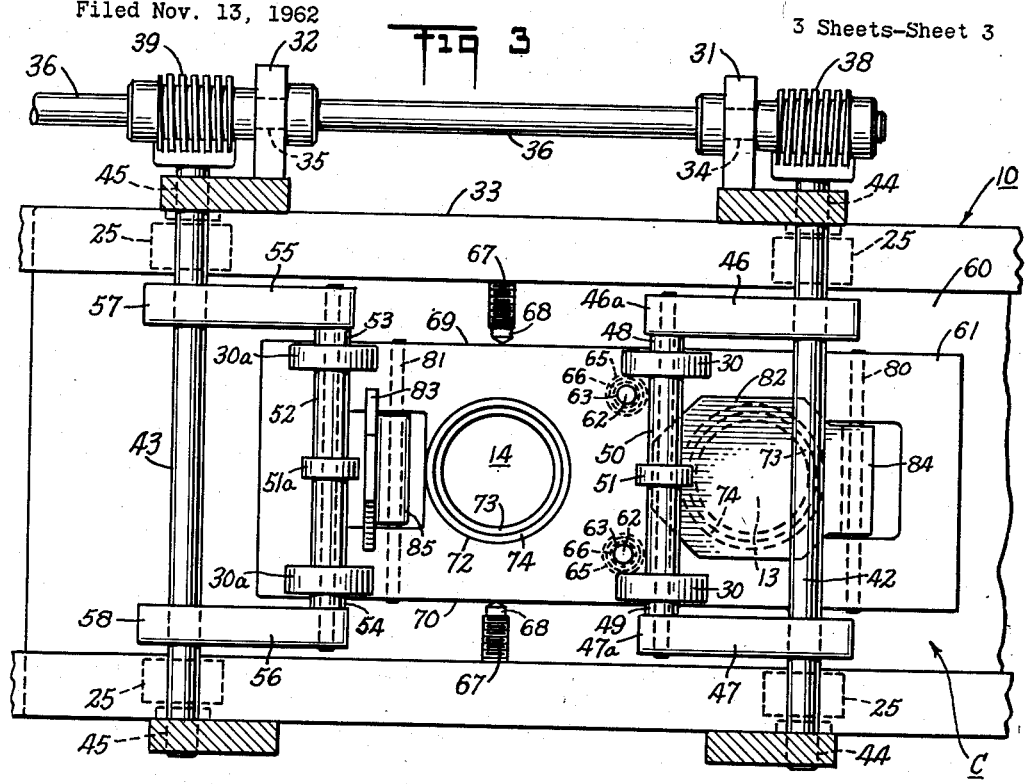
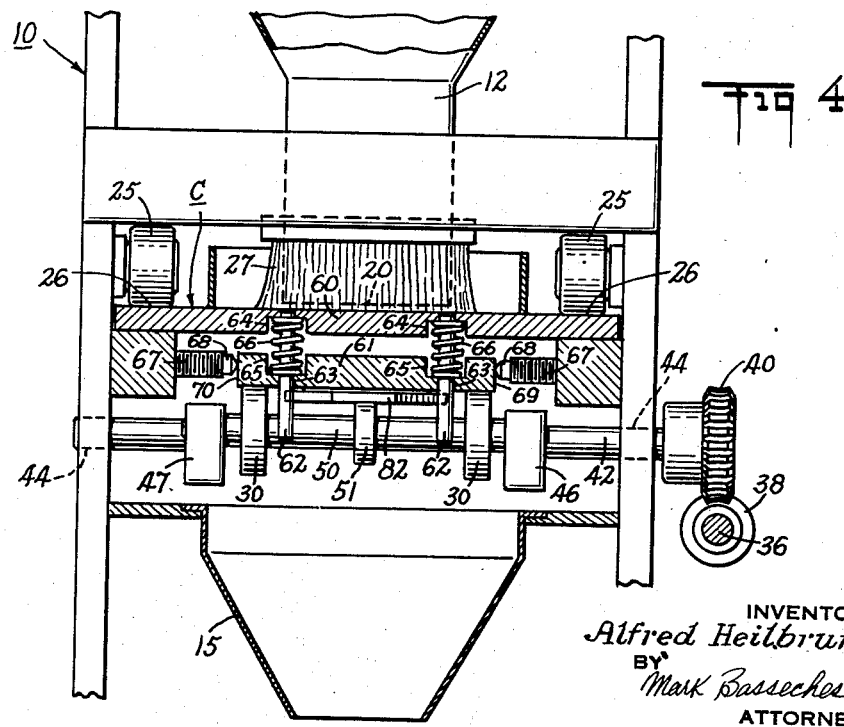
INVENTOR
Alfred Heilbrunn
BY Mark Basseches
ATTORNEY

3,179,304
VOLUMETRIC FEEDER

Alfred Heilbrunn, Brooklyn, N.Y., assignor to RPM, Incorporated, Brooklyn, N.Y., a corporation of New York
Filed Nov. 13, 1962, Ser. No. 236,970
6 Claims. (Cl. 222—267)

This invention relates to a feeder device, and more particularly to a volumetric feeder device wherein a variable volume of material may be removed from a bulk supply hopper and transferred to a discharge point for packaging or the like. More particularly, this invention relates to a volumetric feeder mechanism having novel features not heretofore found in feeders of this sort.

Still more particularly, this invention relates to a volumetric feeder device which may be adjusted without interrupting the normal operation thereof, to vary the volume or bulk of material extracted from the main hopper, thereby eliminating production interruptions required in the adjustment of devices heretofore known. This invention relates further to a feeder of the type described which may be rapidly adjusted to permit the dispensing of greatly increased or decreased volumes of a commodity, and which may be adjusted within precise limits of accuracy.

Still more particularly, this invention relates to a feeder having novel features which assure gentle handling of the dispensed material, thereby rendering the feeder particularly useful for handling fragile, easily broken or crushed goods which might be damaged if used in feeders of the types heretofore known.

Still more particularly, this invention relates to a feeder having metering cups or chambers which are provided with novel closure portions whereby material carried in the cups or chambers from the hopper to the discharge area, is protected against damage due to squeezing, wiping or like deleterious effects associated with feeders heretofore known. By the same token, elimination of breakage, etc., results in a cleaner operation and reduces wear and frequent shut downs due to accumulation of detritus in the machine.

Further, the invention relates to an improved feeder wherein the movement of material from the bulk hopper to the discharge chute takes place with a minimum vertical drop of the material, the novel feeder design permitting facile handling of the material with minimum vertical displacement thereof.

Briefly described, the novel feeder assembly includes the following improvements in particular, which permit the desirable characteristics above noted.

(I) The feeder includes a shiftable carriage having expansible and contractible metering cups to effect variations of volume, which cups are supported in a novel carriage assembly. Novel adjustment means are fixed to the stationary frame of the device whereby the expanded or contracted condition of the cups or chambers may be varied without interrupting movement of the carriage. Thus, to obtain a desired volume, samples may be extracted and minute adjustments made, without undergoing the tedious process required with prior devices, of shutting down the machine, making an adjustment, checking the quantity dispensed, readjusting in accordance with the sample, etc.

(II) The metering cups or chambers are provided with novel closure portions and operating means which, during portions of the operating cycle, cover the lower edges of the cups or chambers to prevent escape of material carried therein. The closure portions pivot clear of the metering cups to permit discharge when the cups are properly positioned. Thus, the necessity for employing a sliding engagement between the filled cups and an extended, flat undersurface, a customary expedient in the past, is avoided.

The sliding bottom closure customarily employed induced tumbling of the lower cup contents, wedging of such contents between the cup and the closure, and like fracture and detritus inducing influences which are avoided in the present device.

(III) Applicant has found that a further reduction in the breakage or fracture of articles fed can be effected by reducing the vertical distance articles must travel in advancing from the hopper exit to the cup discharge receiver point. Applicant has effected a reduction of this distance in a reciprocating feeder device by providing spaced hopper exits and by positioning the discharge receiver point below and laterally intermediate the hopper exits. The metering cups fill when beneath the hopper exits and discharge at the central point when in registry with the discharge receiver. By the use of two hopper exits, a center discharge is made possible. The entrance to the bagging or packaging device may thus be placed very close to the height of the lower edge of the metering cups. In contrast, heretofore known reciprocating feeders employed a single hopper exit, providing discharge at points disposed to each side of the hopper exit. Such an arrangement required the use of a trough or funnel-like collecting discharge chute which would gather the material deposited at spaced points and guide the latter to a central position. To provide the lateral movement needed to center the material deposited at spaced points, a considerable downward movement must be imparted by the funnel. Much breakage, crumbling, etc. resulted from the use of a trough or funnel type collector due to the tumbling of the material being collected. Where the material is deposited at spaced points, as in heretofore known devices, the wasteful provision of multiple bagging or packaging facilities is the only alternative to the collecting funnel.

Accordingly, it is an object of the invention to provide an improved feeder.

A further object of the invention is to provide an improved volumetric feeder which may be adjusted to vary the quantity of materials dispensed, without necessitating disassembly, or interrupting the operation of the feeder.

Still a further object of the invention is to provide an efficient volumetric feeder of particular value in dispensing delicate or readily crumbled articles, to minimize the chance of damaging such articles.

Still a further object of the invention is to provide a volumetric feeder of novel design wherein the hopper exit is spaced a minimum distance above the entrance of the receiving mechanism, whereby the materials dispensed will be required to travel a minimum vertical distance and will not be required to be shifted or centered by traversing an extended chute or funnel wall.

Still a further object of the invention is the provision of a volumetric feeder having novel sealing means for the metering cups thereof, whereby relative movement between the material carried in the cups and the bottom or sealing portion of the device is eliminated, thereby preventing damage to the material and the formation of detritus due to wiping effects.

To attain these objects and such further objects as may appear herein or be hereinafter pointed out, reference is made to the accompanying drawings, forming a part hereof, in which—

FIGURE 1 is a vertical section through a feeder in accordance with the invention;

FIGURE 2 is a horizontal section on the line 2—2 of FIGURE 1;

FIGURE 3 is a magnified horizontal section taken on the line 3—3 of FIGURE 1;

FIGURE 4 is a magnified vertical section taken on the line 4—4 of FIGURE 1.

In accordance with the invention, a frame 10 forms a support upon which is mounted a bulk hopper 11. The hopper 11 includes a lower distributor portion 12 wherein material is dispensed to feed cups or chambers 13, 14, mounted on a horizontal carriage assembly shown generally at C. The carriage assembly functions to remove metered quantities of material in the cups from the distributor portion 12 of the hopper and deposit the same within a discharge receiver chute 15 which is disposed in communicating relationship with a bagging assembly.

The distributor portion 12 terminates in a pair of downwardly directed, generally squared exit apertures 20, 21. At a central point within the distributor portion 12 there is formed an inverted pyramidal section 22 which functions to deflect material descending from the hopper 11 toward the distributor exits 20, 21. The hopper 11 preferably includes overhanging baffle-like elements 23, 24, overlying the column of material stacked above exits 20, 21, respectively, thereby limiting the height of the column of material which may be stacked above said exit portions.

Frame 10 includes a plurality of anti-friction means in the form of rollers 25, which rollers 25 have their lower peripheries 26 tangential to a horizontal plane just beneath the plane of the exit portions 20, 21 of the distributor portion 12.

There is additionally supported from the frame 10 a pair of downwardly directed brush elements 27, 28, lying inwardly adjacent the exit portions 20, 21, the lower terminal edges of said brushes preferably lying in a plane slightly below the lower peripheral portions 26 of the anti-friction rollers 25.

The carriage assembly C is supported for reciprocating movement with an upper edge portion of said carriage assembly bearing against the lower peripheral portions 26 of the anti-friction rollers 25, the undersurface of said carriage assembly being supported on vertically adjustable anti-friction rollers 30, 30, 30a, 30a. The rollers 30, 30, 30a, 30a are carried on and form a part of the volume adjusting assembly next to be described.

A pair of brackets 31, 32 are affixed to a side portion 33 of the frame 10. The brackets include aligned, horizontally disposed bearing apertures 34, 35, within which horizontally disposed adjustment shaft 36 is rotatably mounted. The shaft 36 is keyed to an adjustment knob 37 and is provided with spaced worms 38, 39, lying adjacent the brackets 32 and 31, respectivley. Worms 38, 39 are meshed, respectively, with spirally toothed gear members 40, 41, which are in turn keyed to horizontal shafts 42, 43. The shafts 42, 43 are supported in paired bearing members 44, 44, 45, 45, respectively, carried by the frame 10.

A pair of spaced parallel operating arms 46, 47 are keyed to the shaft 42. The inner ends 46a, 47a of the arms 46, 47 carry the opposed ends 48, 49 of a cross shaft member 50. The cross shaft 50, adjacent the ends 48, 49, carries the rotatable anti-friction rollers 30, 30, and at a central portion carries a further anti-friction roller 51 of lesser diameter than the rollers 30, 30. In a similar manner, anti-friction rollers 30a, 30a are carried on cross shaft 52, the ends 53, 54 of which are carried by operating arms 55, 56, which are keyed at their ends 57, 58 to the shaft 43.

Cross shaft 52, at a central portion, carries an anti-friction roller 51a, which is rotatably mounted with respect to such shaft and is of smaller peripheral diameter than the rollers 30a, 30a.

From the above description, it will be readily recognized that when the knob 37 is rotated, the rotation imparted to the shaft 36 will be transmitted through worms 38, 39 to the gear members 40, 41. The geared connection between the worm 38 and gear 40, and worm 39 and gear 41 is such that the shafts 42, 43 keyed to said gears are rotated in opposite directions to each other. As the shafts 42, 43 are rotated, cross shafts 50, 52, bearing the carriage support rollers 30, 30, 30a, 30a, will be shifted upwardly or downwardly, toward or away from the plane of the exit apertures 20, 21, direction of movement being dependent upon the direction of rotation of the knob 37.

The carriage assembly C will next be described. This assembly includes an upper plate portion 60 and a lower plate portion 61. A pair of depending studs 62, 62 are fixed to the upper plate 60 and extend intimately and slidably through apertures 63, 63 formed in the plate 61. Plates 60, 61, in the areas immediately surrounding the studs 62, are recessed, as at 64, 65, thereby providing shoulders engaging the opposite ends of compression springs 66, 66, biased between the plates and serving to urge plates 60, 61 apart.

Specifically it will be seen that the lower surface of plate 61 and the upper surface of plate 60 will be biased by the action of springs 66, 66 into engagement, respectively, with the anti-friction rollers 30, 30, 30a, 30a and 25.

It will be further seen that movement of the adjustment knob 37, with a consequent upward or downward movement of the anti-friction rollers 30, 30, 30a, 30a, will vary the spacing between plates 60 and 61 by raising or lowering the plate 61.

The plate 61 is maintained in laterally centered position by the conjoint action of the inwardly adjustable threaded members 67, 67 supported on the frame, said members preferably having anti-friction end portions 68, 68, which may be formed of nylon and which serve to bear against the vertical side edges 69, 70 of the plate 61 to cause the same to remain in centered condition without undue play.

The upper plate 60 is provided with paired spaced apertures 71, 71. The lower plate 61 is similarly provided with a pair of apertures 72, 72, which apertures register with apertures 71, 71 formed in the upper plate. Cylindrical sections 73, 73 are supported within apertures 71, 71 of plate 60. A complemental pair of cylindrical sections 74, 74 are carried by the lower plate 61 and supported within apertures 72, 72. Sections 73, 73, 74, 74 are dimensioned so that the outer diameter of upper sections 73, 73 telescopes closely within the inner diameters of the lower sections 74, 74.

From the above description, it will be recognized that as plate 61 is shifted toward and away from plate 60, the nested condition or degree of overlap of the sections 73, 73, 74, 74 will be varied, thereby varying the volumetric content of the cups 13, 14.

The lower plate 61 is provided with spaced, horizontally disposed pivot members 80, 81, preferably formed at a recessed portion within the plate 61. The pivot members 80, 81 form hinged supports for the vertically swingable closure members 82, 83. The closure members 82, 83 are provided at their outer ends with offset bracket portions 84, 85, having formed thereon bearings which are received on the pivot members 80, 81, respectively. The length of the bracket arms 84, 85 and the point of formation of the bearing apertures therein is such that when the closures 82, 83 are horizontally disposed, they lie in the plane of and form sealing closures for the lower edge portions 74a, 74a of the cylindrical sections 74, 74.

The closures 82, 83 are located to be engaged by the anti-friction rollers 51, 51a, respectively, during the shifting of the carriage C, the roller 51 being positioned to cam the closure member 82 to horizontal position, whereat said closure member forms a bottom seal for the cup 13 when the carriage is in the righthandmost position, as shown in FIGURE 1. Similarly, the roller 51a, at such right hand position of the carriage, is disposed clear of the closure 83 and permits the same to hang in a vertical, bottom exposing position of cup 14.

It will be readily recognized that as the carriage C is reciprocated roller 51 traverses the undersurface of closure member 82 and permits the same to drop open after clearing such undersurface. Simultaneously, upon such leftward shifting movement of the carriage, as viewed in FIGURE 1, the roller 51a will engage the undersurface of closure 83, gradually camming the latter upwardly to form a sealing bottom or closure beneath the cup 14.

It will thus be observed that on alternate reciprocating movement of the carriage, one and then the other of the closures 82, 83 will form a seal beneath its respective cup. The carriage may be reciprocated between limiting positions by any known mechanism, it being preferred to use a Geneva drive or the like to provide a dwell when the cups 13 and 14 reach their limiting positions.

In the illustrated embodiment, a chain drive Ch links sprocket 99 with a power source (not shown). The sprocket is made fast to one half 100 of a clutch element, the other half being shown at 101. The elements 100 and 101 may be linked by actuation of operating handle 102 in the direction of the arrow, FIGURE 2. The clutch element 101 is keyed to drive shaft 103, which drives flywheel 104, having an eccentric pin 105 affixed thereto. Crank lever 106 is pivotally connected between pin 105 and a cross shaft 107 mounted on bracket 108, made fast to the carriage C. The rotary movement of the shaft 103 is thus converted to a reciprocal movement communicated by the crank lever 106 to the carriage C.

Discharge receiver chute 15 is located intermediate the exit portions 20, 21. It will be recognized that the cups 13 and 14 on the carriage are spaced apart about half as far on centers as are exit portions 20, 21, and thus when cup 13 is disposed beneath exit aperture 20, cup 14 will lie above the discharge chute 15. Similarly, when the cup 14 is located in registry with exit aperture 21, cup 13 will lie in registry with chute 15. Thus it will be seen that as one cup is discharging its contents into chute 15, the other cup is being filled.

By providing a centered discharge receiver and spaced exit portions to either side of the receiver, it will be observed that a minimum vertical travel of material discharged by the cups is required. For example, if a discharge from the cups at spaced ends were effected the material would need to be moved a considerable lateral distance to a central gathering or bagging position. Such lateral movement would require the use of a deep, funnel-like structure and would thereby require considerable downward tumbling movement of the material after discharge from the cup. In the present device, it will be recognized that there is no limitation upon the proximity with which the chute or a bagging assembly may be positioned beneath the lower plate 61.

In operation, the hopper 11 may be filled with the desired commodity. The overhanging portions 23, 24 of the hopper provide an upper limit of the column of material which builds up directly above the exit apertures 20, 21, thereby limiting the pressure or weight of material directly above such portions. When the clutch elements 100, 101 are engaged, the carriage will be reciprocated by the eccentric drive communicated to the carriage by lever 106 between first and second limiting positions, respectively, aligning cup 14 with exit aperture 21 and cup 13 with discharge chute 15, and then cup 14 with discharge chute 15 and cup 13 with exit aperture 20.

It will be recognized that when either cup is positioned beneath the exit aperture, the cup will be entirely filled, the appropriate closure 82 or 83 forming a bottom or floor for the cup when in filling position. As the carriage reciprocates away, the appropriate brush 27, or 28, serves to level the upper surface of the material in the cup, to assure uniform filling. As the filled cup reaches the position whereat it registers with the discharge chute 15, the appropriate closure 82 or 83 will be released from connection with the appropriate stationary anti-friction member 51 or 51a, permitting the closure to swing clear of the cup under the influence of gravity.

It will be noted that the provision of a swinging closure plate beneath the cups eliminates problems of crushing, grinding or tumbling the material in the cup encountered in conventional devices wherein a sliding plate provided the closure beneath the shifting cup.

Since adjustment of the volume of the cups is effected by shifting of the adjustment knob 37 which is fixed to the frame, the volume of the cups may be varied without interrupting the movement of the carriage C. This is most important in commercial practice since often materials which are packaged by weight will vary in specific gravity from batch to batch. For instance, a given volume of one batch of peanuts may weigh precisely one ounce, whereas the same volume of a different batch of peanuts may weigh more or less. To assure accurate weight in devices heretofore known, it was necessary to disassemble the machine, or at least to interrupt the operation of the machine in order to make adjustments for volume changes in the idle condition of the machine. Moreover, since such adjustment is primarily a trial and error procedure, volume variation in the past involved not merely one interruption of operation and adjustment but often a series of interruptions. In the present device, it is merely necessary to weigh a random example and if such example is not of the desired weight to vary the volumetric capacity of the cups in the direction which will compensate for the plus or minus factor. It will be further observed that an under or over correction may be quickly remedied.

While the illustrated embodiment of the invention includes nesting upper and lower cup members, it should be understood that under certain circumstances a stretchable elastomeric cup member may be employed, the upper edge of such cup member being affixed to the upper plate and the lower portion being affixed to the lower plate, in a manner which will be apparent in the light of the above description.

Still other and further variations in the device may be made without departing from the spirit of the invention. Thus, for example, the lower plate of the carriage may be supported for sliding movement against bearings fixed to the frame, and the entire hopper assembly carrying the upper anti-friction rolls may be shiftable upwardly and downwardly, to effect volumetric adjustment of the feed cups. Accordingly, the invention is to be broadly construed within the scope of the appended claims.

Having thus described the invention and illustrated its use, what is claimed as new and is desired to be secured by Letters Patent is:

1. A feeder device for removing variable selected volumes of material from a hopper and depositing said volumes at a discharge point, comprising a frame, a hopper on said frame, an exit aperture beneath said hopper, a carriage movably mounted beneath said hopper and including upper and lower spaced parallel plates, first anti-friction guide means on said frame bearing against the upper surface of said upper plate, second anti-friction guide means bearing against the lower surface of said lower plate, spring means interposed between and urging said plates away from each other and against said guide means, a lengthwisely expandible receiver cup member having upper and lower portions engaging said upper and lower plates, respectively, and means for adjustably shifting said guide means toward and away from each other.

2. A feeder device for removing variable selected volumes of material from a hopper and depositing said volumes at a discharge point, comprising a frame, a hopper on said frame, an exit aperture beneath said hopper, a carriage movably mounted beneath said hopper and including upper and lower spaced parallel plates, first anti-friction guide means on said frame bearing against the upper surface of said upper plate, second anti-friction guide means bearing against the lower surface of said lower plate, spring means interposed between and urging said plates away from each other, a lengthwisely expandible receiver cup member having upper and lower portions engaging said upper and lower plates, respectively, and stationary adjustment means fixed to said frame operably associated with one of said guide means for adjustably shifting said guide means toward and away from each other.

3. A feeder device for removing variable selected volumes of material from a hopper, comprising a frame, a hopper on said frame, an exit aperture formed in the underside of said hopper, a carriage movably mounted beneath said hopper, and including upper and lower, relatively vertically movable spaced parallel plate portions, movable anti-friction guide means carried by said frame, spring means urging one of said plates against said guide means, stationary adjustment means operatively connected to said guide means and arranged to shift said guide means vertically, whereby to vary the vertical position of said one plate, and a lengthwise expansible and contractible metering cup having upper and lower edges connected respectively to said upper and lower plates.

4. A feeder device adjustable to remove a selected volume of material from a bulk hopper and deposit the same in a discharge receiver comprising a frame, a hopper on said frame, an exit aperture formed in the underside of said hopper, first horizontally disposed anti-friction means on said frame aligned substantially with the plane of said exit portion, a first horizontal plate member having an upwardly directed portion slidably engaging said first anti-friction means, threaded adjustment means mounted on said frame, second anti-friction means in a plane below said first anti-friction means and operatively connected to said adjustment means to be shiftable by said adjustment means toward and away from said hopper, a second horizontal plate member having a downwardly directed portion slidably engaging and supported upon said second anti-friction means, spring means interposed between said first and second plate members biasing said members against said first and second guide means, respectively, said first and second plate members having registering apertures formed therein, a vertically extensible metering cup having upper and lower portions operatively connected with said first and second plates, respectively, and having its interior registering with said apertures of said plates, a discharge receiver beneath said second plate member, and means for shifting said plates horizontally in position to align said cup sequentially with said exit aperture of said hopper and said discharge receiver.

5. A feeder assembly comprising a bulk supply hopper, first and second laterally spaced horizontal exit apertures formed in said hopper, a reciprocable distributor carriage mounted beneath said hopper, said carriage having first and second spaced article receiver chambers, drive means for shifting said carriage relative to said hopper in the direction of spacing of said chambers between first and second limiting positions, a discharge means at a station beneath said carriage, said means being located intermediate said exit portions of said hopper, said first article receiver being in registry with said first exit aperture and said second article receiver being in registry with said discharge means in one said limiting position of said carriage, and said second article receiver being in registry with said second exit aperture and said first article receiver being in registry with said discharge means in said other limiting position of said carriage, said assembly including laterally extending baffle members spaced above and overlying said exit apertures whereby the height of a column of material in said hopper overlying said exit apertures is limited by the spacing of said baffle members from said apertures.

6. A feeder assembly comprising a bulk supply hopper, first and second laterally spaced horizontal exit apertures formed in said hopper, a reciprocable distributor carriage mounted beneath said hopper, said carriage having first and second spaced article receiver chambers, drive means for shifting said carriage relative to said hopper in the direction of spacing of said chambers between first and second limiting positions, said drive means including a rotating member and a crank lever connected between said carriage and said rotating member, the connection at said rotating member being displaced from the axis of rotation of said member, a discharge means at a station beneath said carriage, said means being located intermediate said exit portions of said hopper and including downwardly converging centering wall portions, said first article receiver being in registry with said first exit aperture and said second article receiver being in registry with said discharge means in one said limiting position of said carriage, and said second article receiver being in registry with said second exit aperture and said first article receiver being in registry with said discharge means in said other limiting position of said carriage.

References Cited by the Examiner
UNITED STATES PATENTS

| | | | |
|---|---|---|---|
| 200,692 | 2/78 | Butterfield | 222—361 X |
| 470,475 | 3/92 | Craney | 222—305 X |
| 526,254 | 9/94 | McAnulty | 222—135 |
| 2,205,324 | 6/40 | Venable | 222—145 X |
| 2,527,960 | 10/50 | Rapp | 222—307 X |
| 2,639,837 | 5/53 | Stockdale | 222—276 |

LOUIS J. DEMBO, *Primary Examiner.*

RAPHAEL M. LUPO, *Examiner.*